(12) United States Patent
Hayes

(10) Patent No.: US 6,857,481 B1
(45) Date of Patent: Feb. 22, 2005

(54) ROTARY EDGING BLADE SYSTEM

(76) Inventor: Johnny Hayes, 1223 Firestone Dr., Albany, GA (US) 31705

( * ) Notice: Subject to any disclaimer, the term of this patent is extended or adjusted under 35 U.S.C. 154(b) by 40 days.

(21) Appl. No.: 10/405,419

(22) Filed: Apr. 3, 2003

(51) Int. Cl.$^7$ .............................................. A01B 45/00
(52) U.S. Cl. .......................................... 172/15; 56/256
(58) Field of Search .............................. 172/13, 14, 15, 172/16, 17, 42; 56/255, 256, 294, 295, 296

(56) References Cited

U.S. PATENT DOCUMENTS

| | | | | |
|---|---|---|---|---|
| 3,192,693 A | * | 7/1965 | Bergeson ..................... 56/13.7 |
| 4,072,195 A | * | 2/1978 | Carlson ........................ 172/15 |
| 5,226,248 A | * | 7/1993 | Pollard ........................... 37/94 |
| 5,592,992 A | * | 1/1997 | Thompson .................... 172/15 |

* cited by examiner

*Primary Examiner*—Robert E. Pezzuto
(74) *Attorney, Agent, or Firm*—Edward P. Dutkiewicz

(57) ABSTRACT

A blade is formed of a vertical segment. The vertical segment has a central aperture. The vertical segment further has long parallel side edges, short parallel end edges and upturned parallel ends. Each end has a leading edge and a trailing. A horizontal cutting edge is formed into each leading edge of the upturned parallel ends. A vertical cutting edge is formed into each long edge adjacent to a horizontal cutting edge.

5 Claims, 3 Drawing Sheets

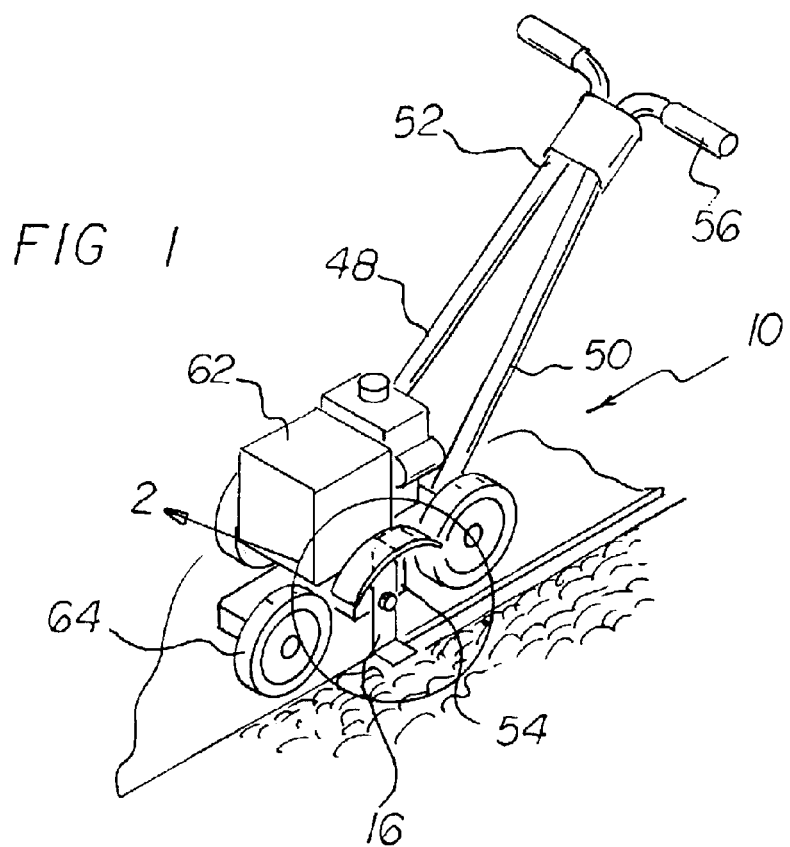
FIG 1
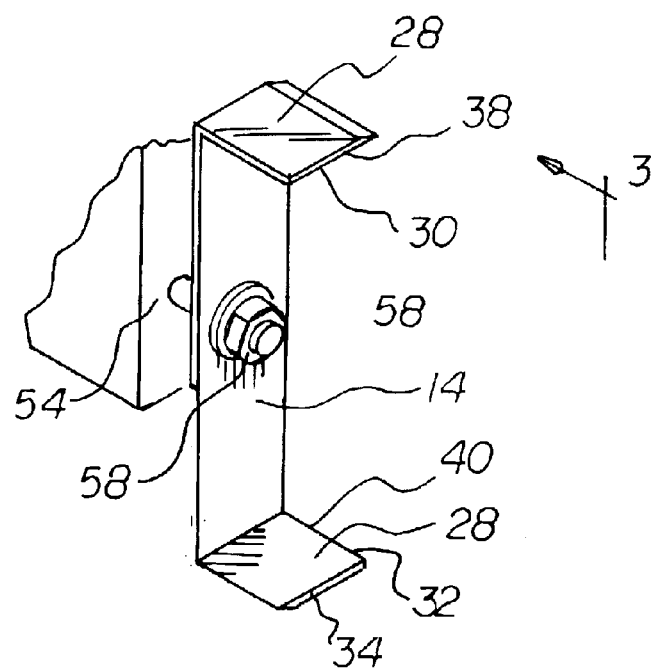
FIG 2

FIG 3
FIG 4
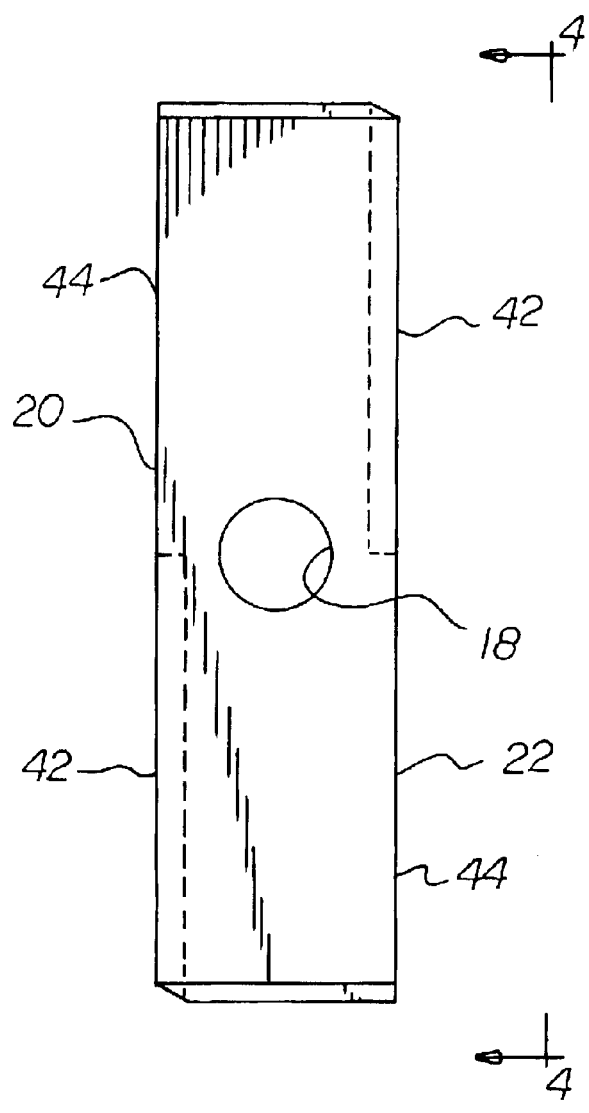
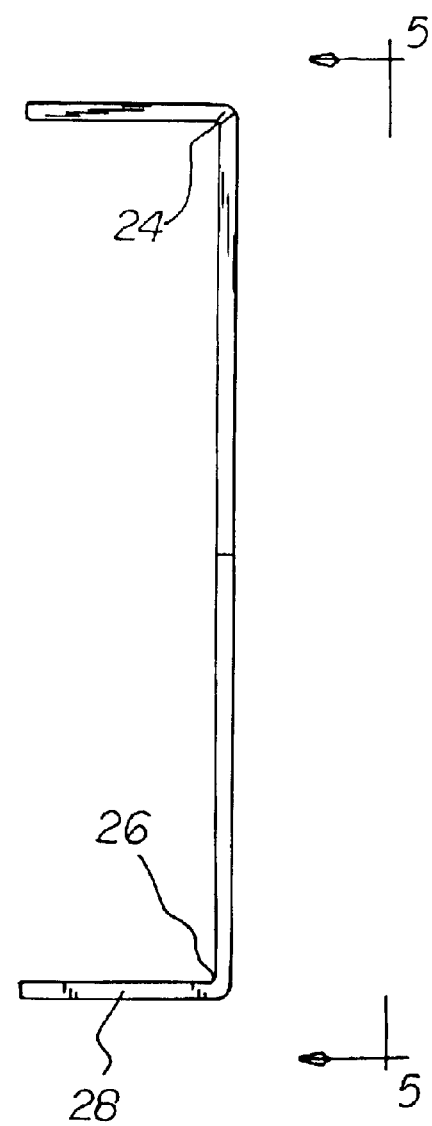

ROTARY EDGING BLADE SYSTEM

BACKGROUND OF THE INVENTION

1. Field of the Invention

The present invention relates to a rotary edging blade system and more particularly pertains to safely and efficiently edging flower beds and the like.

2. Description or the Prior Art

The use of trimming and edging blades of known designs and configurations is known in the prior art. More specifically, trimming and edging blades of known designs and configurations previously devised and utilized for the purpose of edging grassy areas and the like by conventional methods and apparatuses are known to consist basically of familiar, expected, and obvious structural configurations, notwithstanding the myriad of designs encompassed by the crowded prior art which has been developed for the fulfillment of countless objectives and requirements. By way of example, U.S. Pat. No. Des. 221,483 to Terwilliger discloses a lawn trimmer blade for sprinkled heads. U.S. Pat. No. 3,395,521 to Crockett discloses a thatch remover attachment for rotary lawnmowers. U.S. Pat. No. Des. 263,549 to Bennett discloses a garden implement blade. U.S. Pat. No. 44,862,682 to Wait discloses a cutting assembly for high-speed rotary grass trimming device. U.S. Pat. No. 5,056,605 to Bond discloses a multipurpose cutting means. Lastly, U.S. Pat. No. 6,302,219 to Filippini discloses an edging blade for powered landscaping edgers.

While these devices fulfill their respective, particular objectives and requirements, the aforementioned patents do not describe a rotary edging blade system that allows safely and efficiently edging flower beds and the like.

In this respect, the rotary edging blade system according to the present invention substantially departs from the conventional concepts and designs of the prior art, and in doing so provides an apparatus primarily developed for the purpose of safely and efficiently edging flower beds and the like.

Therefore, it can be appreciated that there exists a continuing need for a new and improved rotary edging blade system which can be used for safely and efficiently edging flower beds and the like. In this regard, the present invention substantially fulfills this need.

SUMMARY OF THE INVENTION

In view of the foregoing disadvantages inherent in the known types of trimming and edging blades of known designs and configurations now present in the prior art, the present invention provides an improved rotary edging blade system. As such, the general purpose of the present invention, which will be described subsequently in greater detail, is to provide a new and improved rotary edging blade system and method which has all the advantages of the prior art and none of the disadvantages.

To attain this, the present invention essentially comprises a blade. The blade is fabricated of stainless steel. The blade is in a plate-like configuration. The blade further has a thickness of about 0.125 inches plus or minus 10 percent. The blade is formed of a vertical segment. A central circular aperture is provided through the vertical segment. The diameter of the aperture is about 1 inch plus or minus 10 percent. The center of the aperture is the axis of rotation of the vertical segment. The vertical segment has long parallel side edges. The side edges are between about 6 and 10 inches, preferably about 8 inches, in length. The vertical segment has short parallel end edges. The end edges are between about 1.5 and 2.5 inches, preferably 2 inches, in length. The vertical segment has upturned parallel ends. Each end has a horizontal leading edge and a horizontal trailing edge. Each end further has a vertical upper edge and a vertical lower edge coincident with an end edge of the vertical segment. The leading and trailing edges are between about 1.5 and 2.5 inches, preferably 2 inches, in length.

A horizontal cutting edge is provided. The horizontal cutting edge is formed into each horizontal leading edge of the upturned parallel ends. Also provided is a horizontal blunt edge. The horizontal blunt edge is formed into each horizontal trailing edge of the upturned parallel ends. A vertical cutting edge is provided. The vertical cutting edge is formed into one half of each long edge. The vertical cutting edge is provided adjacent to a horizontal cutting edge of an end. A vertical blunt edge is provided. The vertical blunt edge is formed into one half of each vertical blunt edge of the vertical segment. The cutting edges form two L-shaped cutting regions. The blunt edges form two L-shaped non-cutting regions.

Further provided is a drive assembly. The drive assembly has an elongated component. The drive assembly also has an upper end and a lower end. The upper end has a handle. The handle is for being held by a user during operation and use. The lower end has a removable bolt. The bolt passes through the aperture in the blade.

Provided last is a motor. The motor is supported by the drive assembly. The motor is coupled to the bolt and the blade. The blade rotates the vertical segment in a vertical path of movement. In this manner grass is cut beneath. The blade rotates the ends in a cylindrical path of movement. In this manner vegetation is trimmed and edged at the edge of a flower bed and the like.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rotary edging blade system which has all of the advantages of the prior art trimming and edging blades of known designs and configurations and none of the disadvantages.

It is another object of the present invention to provide a new and improved rotary edging blade system which may be easily and efficiently manufactured and marketed.

It is further an object of the present invention to provide a new and improved rotary edging blade system which is of durable and reliable constructions.

An even further object of the present invention is to provide a new and improved rotary edging blade system which is susceptible of a low cost of manufacture with regard to both materials and labor, and which accordingly is then susceptible of low prices of sale to the consuming public, thereby making such rotary edging blade system economically available to the buying public.

Even still another object of the present invention is to provide a rotary edging blade system for safely and efficiently edging flower beds and the like.

Lastly, it is an object of the present invention to provide a new and improved rotary edging blade system. A blade is formed of a vertical segment. The vertical segment has a central aperture. The vertical segment further has long parallel side edges, short parallel end edges and upturned parallel ends. Each end has a leading edge and a trailing. A horizontal cutting edge is formed into each leading edge of the upturned parallel ends. A vertical cutting edge is formed into each long edge adjacent to a horizontal cutting edge.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention wile be better understood and objects other than those set forth above will become apparent when consideration is given to the following detailed description thereof. Such description makes reference to the annexed drawings wherein:

FIG. 1 is a perspective illustration of a rotary edging blade system for safely and efficiently edging flower beds and the like constructed in accordance with the principles of the present invention.

FIG. 2 is an enlarged perspective illustration of the rotary edging blade of the system of FIG. 1 taken at circle 2 of FIG. 1.

FIG. 3 is a front elevational view of the rotary edging blade shown in FIGS. 1 and 2.

FIG. 4 is a top view of the rotary edging blade shown in FIGS. 1, 2 and 3 taken along line 4—4 of FIG. 3.

The same reference numerals refer to the same parts throughout the various Figs.

DESCRIPTION OF THE PREFERRED EMBODIMENT

Figure 5:
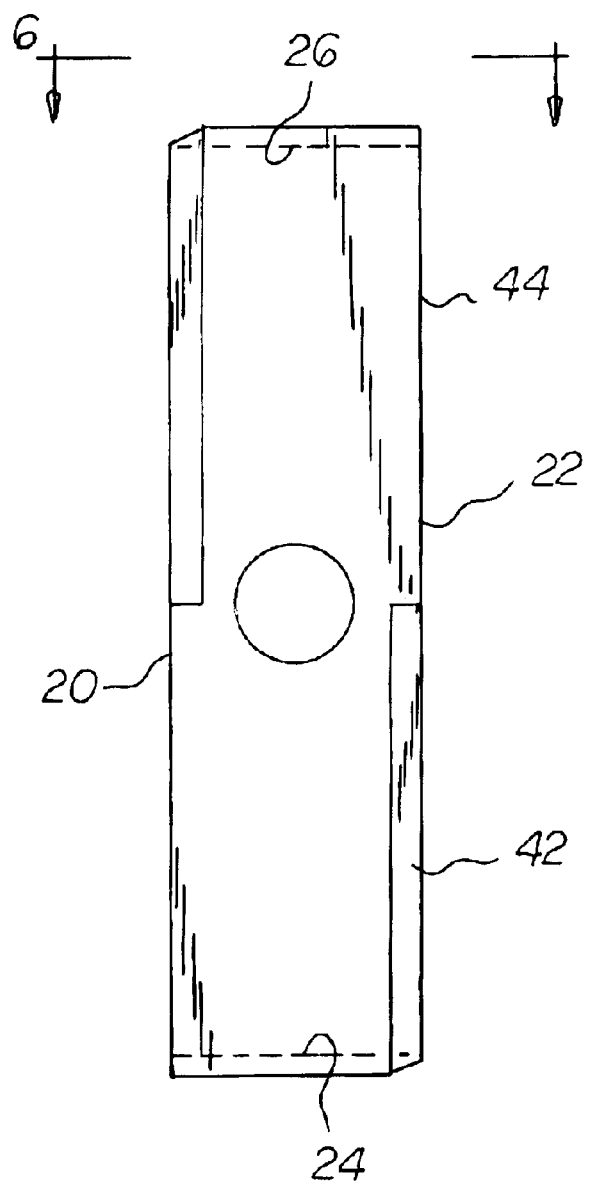
FIG. 5 is an end elevational view of the rotary edging blade shown in the prior Figs. and taken along line 5—5 of FIG. 3.
Figure 6:
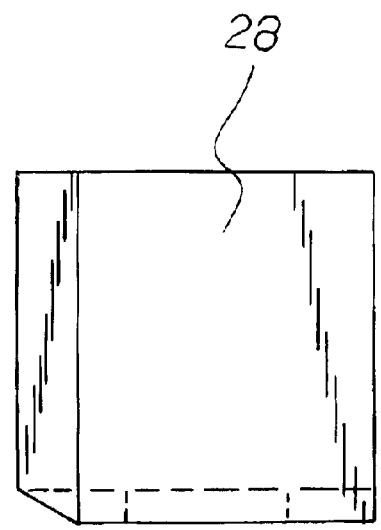
FIG. 6 is a bottom view of the rotary edging blade shown in the prior Figs. and taken along line 6—6 of FIG. 3.

With reference now to the drawings, and in particular to Figure 1 thereof, the preferred embodiment of the new and improved rotary edging blade system embodying the principles and concepts of the present invention and generally designated by the reference numeral 10 will be described.

The present invention, the rotary edging blade system 10 is comprised of a plurality of components. Such components in their broadest context include a blade and a horizontal cutting edge. Such components are individually configured and correlated with respect to each other so as to attain the desired objective.

First provided is a blade 14. The blade is fabricated of stainless steel. The blade is in a plate-like configuration. The blade further has a thickness of about 0.125 inches plus or minus 10 percent. The blade is formed of a vertical segment 16. A central circular aperture 18 is provided through the vertical segment. The diameter of the aperture is about 1 inch plus or minus 10 percent. The center of the aperture is the axis of rotation of the vertical segment. The vertical segment has long parallel side edges 20, 22. The side edges are between about 6 and 10 inches, preferably about 8 inches, in length. The vertical segment has short parallel end edges 24, 26. The end edges are between about 1.5 and 2.5 inches, preferably 2 inches, in length. The vertical segment has upturned parallel ends 28. Each end has a horizontal leading edge 30 and a horizontal trailing edge 32. Each end further has a vertical upper edge 34 and a vertical lower edge coincident with an end edge of the vertical segment. The leading and trailing edges are between about 1.5 and 2.5 inches, preferably 2 inches, in length.

A horizontal cutting edge 38 is provided. The horizontal cutting edge is formed into each horizontal leading edge of the upturned parallel ends. Also provided is a horizontal blunt edge 40. The horizontal blunt edge is formed into each horizontal trailing edge of the upturned parallel ends. A vertical cutting edge 42 is provided. The vertical cutting edge is formed into one half of each long edge. The vertical cutting edge is provided adjacent to a horizontal cutting edge of an end.

A vertical blunt edge 44 is provided. The vertical blunt edge is formed into one half of each vertical blunt edge of the vertical segment. The cutting edges form two L-shaped cutting regions. The blunt edges form two L-shaped non-cutting regions.

Further provided is a drive assembly 48. The drive assembly has an elongated component 50. The drive assembly also has an upper end 52 and a lower end 54. The upper end has a handle 56. The handle is for being held by a user during operation and use. The lower end has a removable bolt 58. The bolt passes through the aperture in the blade.

Provided last is a motor 62. The motor is supported by the drive assembly with wheels 64, preferably three wheels, there beneath. The motor is coupled to the bolt and the blade. The blade rotates the vertical segment in a vertical path of movement. In this manner grass is cut beneath and its soil is upturned. The blade rotates the ends in a cylindrical path of movement. In this manner vegetation is trimmed and the soil upturned at the edge of a flower bed and the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings described in the specification are intended to be encompassed by the present invention.

Therefore, the foregoing is considered as illustrative only of the principals of the invention. Further; since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A rotary edging blade system for safely and efficiently edging flower beds comprising, in combination:

a blade fabricated of stainless steel in a plate-like configuration with a thickness of about 0.125 inches plus or minus 10 percent and formed of a vertical segment with a central circular aperture with a diameter of about 1 inch plus or minus 10 percent there through, the center of the aperture being the axis of rotation of the vertical segment, the vertical segment having long parallel side edges between about 6 and 10 inches in length and short parallel end edges between about 1.5 and 2.5 inches in length, the vertical segment having upturned parallel ends, each end having a horizontal leading edge and a horizontal trailing edge with a vertical upper edge and a vertical lower edge coincident with an end edge of the vertical segment, the leading and trailing edges being between about 1.5 and 2.5 inches in length;

a horizontal cutting edge formed into each horizontal leading edge of the upturned parallel ends and a horizontal blunt edge formed into each horizontal trailing edge of the upturned parallel ends, a vertical cutting edge formed into one half of each long edge adjacent to a horizontal cutting edge of an end and a vertical blunt edge formed into one half of each vertical blunt edge of the vertical segment, the parallel end at each end of the blade thus forming two parallel rectangles each rectangle having an end edge adjacent to the blade and a parallel blunt edge, each rectangle also having, perpendicular to the blade, a leading cutting edge and a parallel trailing edge, the cutting edges forming two L-shaped cutting regions and the blunt edges forming two L-shaped non-cutting regions;

a drive assembly having an elongated component with an upper end and a lower end, the upper end having a handle for being held by a user during operation and use, the lower end having a removable bolt passing through the aperture in the blade; and a motor supported by the drive assembly and coupled to the bolt and the blade for rotating the bolt and the blade with the blade rotating the vertical segment in a vertical path of movement to cut grass there beneath and with the blade rotating the ends in a cylindrical path of movement to edge and trim vegetation at the edge of a flower bed and the like.

2. A rotary edging blade system comprising:

a blade formed of a vertical segment with a central aperture and having long parallel side edges and short parallel end edges and upturned parallel ends, each end having a leading edge and a trailing edge; and a horizontal cutting edge formed into each leading edge of the upturned parallel ends and a vertical cutting edge formed into each long edge adjacent to a horizontal cutting edge, the parallel end at each end of the blade thus forming two parallel rectangles, each rectangle having an end edge adjacent to the blade and a parallel blunt edge, each rectangle also having, perpendicular to the blade, a leading cutting edge and a parallel trailing edge, the cutting edges thus forming two L-shaped cutting regions and the blunt edges forming two L-shaped non-cutting regions.

3. The system as set forth in claim 2 and further including:

a drive assembly having an elongated component with an upper end and a lower end, the upper end having a handle for being held by a user during operation and use, the lower end having a removable bolt passing through the aperture in the blade.

4. The system as set forth in claim 2 and further including:

a motor supported by the drive assembly and coupled to the bolt and the blade for rotating the bolt and the blade with the blade rotating the vertical segment in a vertical path of movement to cut grass there beneath and with the blade rotating the ends in a cylindrical path of movement to edge and trim vegetation at the edge of a flower bed.

5. The system as set forth in claim 2 wherein the blade is fabricated of stainless steel in a plate-like configuration with a thickness of about 0.125 inches and formed of a vertical segment with a central circular aperture with a diameter of about 1 inch there through, the center of the aperture being the axis of rotation of the vertical segment, the vertical segment having long parallel side edges between about 6 and 10 inches in length and short parallel end edges between about 1.5 and 2.5 inches in length, the vertical segment having upturned parallel ends, each end having a horizontal leading edge and a horizontal trailing edge with a vertical upper edge and a vertical lower edge coincident with an end edge of the vertical segment, the leading and trailing edges being between about 1.5 and 2.5 inches in length.

\* \* \* \* \*